United States Patent
Choi et al.

(10) Patent No.: US 12,325,630 B2
(45) Date of Patent: Jun. 10, 2025

(54) METHOD OF MANUFACTURING SULFIDE-BASED SOLID ELECTROLYTE WITHOUT GENERATION OF IMPURITIES, AND SULFIDE-BASED SOLID ELECTROLYTE MANUFACTURED USING SAME

(71) Applicants: HYUNDAI MOTOR COMPANY, Seoul (KR); KIA CORPORATION, Seoul (KR)

(72) Inventors: Sun Ho Choi, Incheon (KR); Yong Jun Jang, Seongnam-si (KR); In Woo Song, Gwacheon-si (KR); Sang Soo Lee, Goyang-si (KR); So Young Kim, Jeongeup-si (KR); Seong Hyeon Choi, Changwon-si (KR); Sa Heum Kim, Suwon-si (KR); Sang Heon Lee, Yongin-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 582 days.

(21) Appl. No.: 17/675,416

(22) Filed: Feb. 18, 2022

(65) Prior Publication Data
US 2022/0267149 A1 Aug. 25, 2022

(30) Foreign Application Priority Data
Feb. 23, 2021 (KR) .......... 10-2021-0023789

(51) Int. Cl.
C01B 17/22 (2006.01)
C01B 25/14 (2006.01)
H01M 10/0562 (2010.01)

(52) U.S. Cl.
CPC .............. C01B 17/22 (2013.01); C01B 25/14 (2013.01); H01M 10/0562 (2013.01);
(Continued)

(58) Field of Classification Search
CPC .... C01B 17/22; C01B 25/14; H01M 10/0562; H01M 2300/0068
(Continued)

(56) References Cited

U.S. PATENT DOCUMENTS

2014/0227610 A1* 8/2014 Aburatani ................ C03C 1/02
 429/322
2015/0093652 A1 4/2015 Aihara et al.
(Continued)

FOREIGN PATENT DOCUMENTS

| KR | 10-2015-0011300 A | | 1/2015 | |
|---|---|---|---|---|
| KR | 20170077014 A | * | 7/2017 | .......... H01M 10/052 |
| KR | 10-2019-0066792 A | | 6/2019 | |

OTHER PUBLICATIONS

Room Temperature. Dictionary [online]. Merriam-Webster, [retrieved on Nov. 13, 2024]. Retrieved from the Internet: <URL: https://www.merriam-webster.com/dictionary/room%20temperature>. (Year: 2024).*

*Primary Examiner* — Nicholas A Smith
*Assistant Examiner* — Kevin Nguyen
(74) *Attorney, Agent, or Firm* — Morgan Lewis & Bockius LLP

(57) ABSTRACT

A method of manufacturing a sulfide-based solid electrolyte, includes mixing a raw material with an organic solvent to manufacture a mixed solution; a heating step of heating and agitating the mixed solution; a cooling step of cooling and agitating the heated mixed solution; a re-heating step of heating and agitating the cooled mixed solution; and a heat treatment step, effectively synthesizing a sulfide-based solid electrolyte by heating and cooling a mixed solution containing a raw material in an organic solvent to a predetermined temperature.

9 Claims, 3 Drawing Sheets

(52) U.S. Cl.
CPC ...... *C01P 2002/72* (2013.01); *C01P 2002/82* (2013.01); *C01P 2006/40* (2013.01); *H01M 2300/0068* (2013.01)

(58) Field of Classification Search
USPC .......................................................... 429/323
See application file for complete search history.

(56) References Cited

U.S. PATENT DOCUMENTS

2019/0074544 A1* 3/2019 Senga ...................... H01B 1/10
2019/0115622 A1* 4/2019 Kwon ................... B01F 23/511
2020/0194825 A1* 6/2020 Katori .................... H01B 13/00

* cited by examiner

METHOD OF MANUFACTURING SULFIDE-BASED SOLID ELECTROLYTE WITHOUT GENERATION OF IMPURITIES, AND SULFIDE-BASED SOLID ELECTROLYTE MANUFACTURED USING SAME

CROSS REFERENCE TO RELATED APPLICATION

The present application claims priority to Korean Patent Application No. 10-2021-0023789, filed on Feb. 23, 2021, the entire contents of which is incorporated herein for all purposes by this reference.

BACKGROUND OF THE PRESENT DISCLOSURE

Field of the Present Disclosure

The present disclosure relates to a method of manufacturing a sulfide-based solid electrolyte including high ionic conductivity without generation of impurities, and to a sulfide-based solid electrolyte manufactured using the manufacturing method. The present disclosure relates to a method of effectively synthesizing a sulfide-based solid electrolyte by heating and cooling a mixed solution containing a raw material in an organic solvent to a predetermined temperature.

Description of Related Art

Secondary batteries are used as high-performance energy sources for large-capacity power storage batteries, such as electric vehicles or battery power storage systems, and for small portable electronic devices such as mobile phones, camcorders, and notebook computers. To reduce the size of portable electronic devices and use the devices continuously for a long period of time, research is underway on reducing the weight of parts and reducing power consumption.

Lithium ion batteries as secondary batteries have higher energy density, larger capacity per area, lower self-discharge rate, and longer life-span compared to nickel manganese batteries or nickel cadmium batteries. Furthermore, the lithium ion battery has no memory effect, so the lithium ion battery is convenient to use and has a long life-span. However, the lithium ion battery is unreasonable to be used as batteries for next-generation electric vehicles because of the risk of explosion due to overheating and the low energy density and output thereof.

In particular, since a liquid electrolyte is used, there is a risk that safety problems caused by overheating may lead to fire. To overcome the problems of the lithium ion battery using the liquid electrolyte, research and development of all-solid-state lithium ion batteries using solid electrolytes have been actively conducted in recent years.

Because the all-solid-state lithium ion battery includes a solid electrolyte, there is no problem of ignition. The all-solid-state lithium ion battery may have a bipolar structure, so the bulk energy density thereof is five times higher than that of a conventional lithium ion battery.

However, there are limitations in that the solid electrolyte used in the all-solid-state lithium ion battery is very expensive and that it is difficult to perform mass-production and control the particle size thereof. This is the biggest obstacle to commercialization of all-solid-state lithium ion batteries. Therefore, research and development on a new solid electrolyte manufacturing method capable of overcoming the limitations are being actively conducted.

In general, when a sulfide-based solid electrolyte is manufactured, a dry method is mainly used in which precursors of solid electrolytes are mixed using a method such as ball milling. However, this method is very cumbersome in that the milling time has to be set very long, the milled powder has to be separated from balls, and the powder has to be collected so as not to be contaminated by the external environment.

To avoid the inefficiency in the above process, a method of synthesizing a sulfide-based solid electrolyte by reacting raw materials such as $Li_2S$, $LiCl$, and $P_2S_5$ in a polar organic solvent is newly emerging. However, there is a problem in that it is difficult to completely dissolve the raw materials in the polar organic solvent because the raw materials include a compound including a strong bonding force. In other words, because the chemical reaction of the raw materials in the solvent is not actively performed, there are many cases where precipitation is performed while the crystal structure thereof is not formed.

Conventionally, when the raw materials do not participate in the reaction but are included in the resultant material, the raw materials may act as impurities. Because there is a problem in that the ionic conductivity thereof is reduced due to these impurities, a method of reducing or removing such impurities is required.

The information disclosed in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of manufacturing a sulfide-based solid electrolyte including little impurity.

Another objective of the present disclosure is to provide a method of manufacturing a sulfide-based solid electrolyte including high ionic conductivity.

Another objective of the present disclosure is to provide a method of effectively manufacturing a sulfide-based solid electrolyte using an uncomplicated process.

The objectives of the present disclosure are not limited to the foregoing, and will be able to be clearly understood through the following description and to be realized by the means described in the claims and combinations thereof.

To accomplish the above objectives, the present disclosure provides a method of manufacturing a sulfide-based solid electrolyte. The method includes mixing a raw material with an organic solvent to manufacture a mixed solution, a heating step of heating and agitating the mixed solution, a cooling step of cooling and agitating the heated mixed solution, a re-heating step of heating and agitating the cooled mixed solution, and a heat treatment step.

The raw material may include lithium sulfide, phosphorus sulfide, and a halogen compound, and the organic solvent may include any one selected from the group consisting of ethanol, propanol, butanol, dimethyl carbonate, ethyl acetate, tetrahydrofuran, 1,2-dimethoxyethane, propylene glycol dimethyl ether, acetonitrile, and a combination thereof.

The mixed solution may be heated at 1 to 3° C./min in the heating step, the mixed solution may be cooled at −1 to −3°

C./min in the cooling step, and the mixed solution may be heated at 1 to 3° C./min in the re-heating step.

The mixed solution may be heated to synthesize the raw material and the mixed solution may be cooled to precipitate solid particles.

The mixed solution may be heated to 40° C. or higher than 40° C. and the mixed solution may be cooled to 30° C. or lower than 30° C.

Agitation may be performed for 30 minutes to 3 hours in a heating step, agitation may be performed for 30 minutes to 3 hours in a cooling step, and agitation may be performed for 12 to 14 hours in a re-heating step.

Agitation may be performed at a speed of 150 revolutions per minute (RPM) or less for 5 to 10 minutes and then at 250 to 300 rpm for a remaining time in a heating step, and agitation may be performed at a speed of 150 rpm or less than 150 rpm for 5 to 10 minutes and then at 250 to 300 rpm for a remaining time in a cooling step.

The heating step, the cooling step, and the re-heating step may be repeated two to three times.

The method may further include a drying step of drying the mixed solution before the heat treatment step, thus removing the organic solvent.

Solid particles may be heat-treated at a temperature of 500° C. or higher for 4 to 10 hours in the heat treatment step.

The present disclosure also provides a sulfide-based solid electrolyte which includes a compound including an argyrodite-type crystal structure represented by the following Chemical Formula 1.

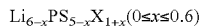   [Chemical Formula 1]

$Li_{6-x}PS_{5-x}X_{1+x} (0 \leq x \leq 0.6)$   [Chemical Formula 1]

(in Chemical Formula 1, X is one or more selected from the group consisting of Cl, Br, I and combination thereof).

An ionic conductivity of the sulfide-based solid electrolyte may be 2.8 mS/cm or more than 2.8 mS/cm.

According to an exemplary embodiment of the present disclosure, it is possible to provide a method of manufacturing a sulfide-based solid electrolyte including little impurity.

According to an exemplary embodiment of the present disclosure, it is possible to provide a method of manufacturing a sulfide-based solid electrolyte including high ionic conductivity.

According to an exemplary embodiment of the present disclosure, it is possible to provide a method of effectively manufacturing a sulfide-based solid electrolyte using an uncomplicated process.

The effects of the present disclosure are not limited to the foregoing, and should be understood to include all effects which may be reasonably anticipated from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
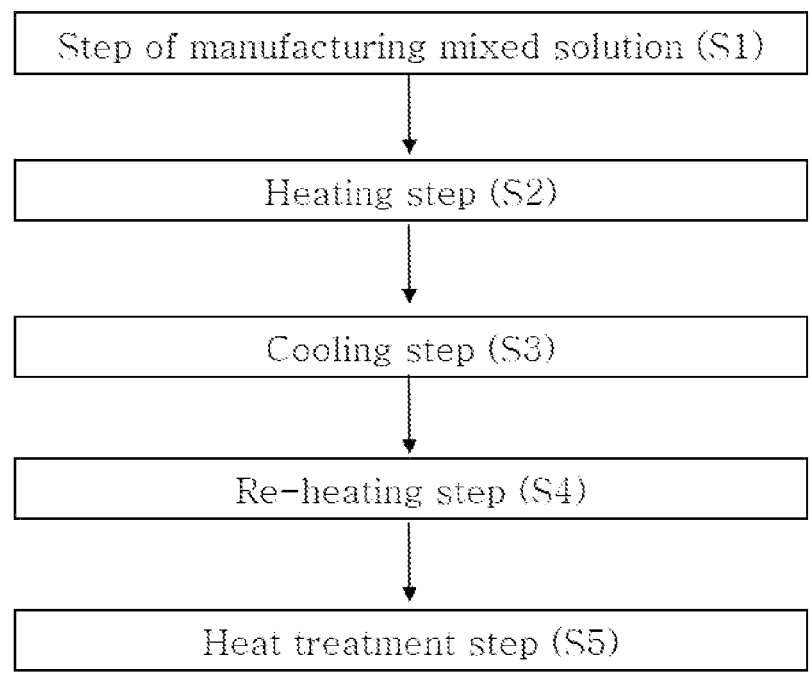
FIG. 1 is a flowchart showing a process of manufacturing a sulfide-based solid electrolyte of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The above and other objectives, features and advantages of the present disclosure will be more clearly understood from the following exemplary embodiments taken However, the present disclosure is not limited to the exemplary embodiments disclosed herein, and may be modified into different forms. These embodiments are provided to thoroughly explain the present disclosure and to sufficiently transfer the spirit of the present disclosure to those skilled in the art.

It will be further understood that the terms "comprise", "include", "have", etc., when used in the exemplary embodiment, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in the exemplary embodiment, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the exemplary embodiment, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

The present disclosure relates to a method of manufacturing a sulfide-based solid electrolyte including high ionic conductivity without generation of impurities, and to a sulfide-based solid electrolyte manufactured using the manufacturing method. The present disclosure provides a method of effectively synthesizing a sulfide-based solid electrolyte by heating and cooling a mixed solution containing a raw material in an organic solvent to a predetermined temperature.

Method of Manufacturing Sulfide-Based Solid Electrolyte

A method of manufacturing a sulfide-based solid electrolyte of the present disclosure includes mixing a raw material with an organic solvent to manufacture a mixed solution, a heating step of heating and agitating the mixed solution, a cooling step of cooling and agitating the heated mixed solution, a re-heating step of heating and agitating the cooled mixed solution, and a heat treatment step.

Hereinafter, the process of manufacturing the sulfide-based solid electrolyte of the present disclosure will be described for each step with reference to FIG. 1.

Step of Manufacturing Mixed Solution (S1)

This step is a step of mixing a raw material with an organic solvent to manufacture a mixed solution.

The raw material includes lithium sulfide, phosphorus sulfide, and a halogen compound. The lithium sulfide may include preferably lithium sulfide ($Li_2S$), the phosphorus sulfide may include diphosphorus pentasulfide ($P_2S_5$), and the halogen compound may include any one selected from the group consisting of lithium bromide (LiBr), lithium chloride (LiCl), lithium iodide (LiI), and a combination thereof.

The organic solvent may include any one selected from the group consisting of ethanol, propanol, butanol, dimethyl carbonate, ethyl acetate, tetrahydrofuran, 1,2-dimethoxyethane, propylene glycol dimethyl ether, acetonitrile, and a combination thereof.

Heating Step (S2)

This step is a step of heating and agitating the mixed solution. This is a step of heating the mixed solution to dissolve the raw material in the solvent, thus inducing the synthesis of the raw material.

The mixed solution is heated to 40° C. or higher than 40° C. and then agitated for 30 minutes to 3 hours. Preferably, after the temperature is increased at a rate of 1° C./min from room temperature to 45 to 55° C., the agitation is performed. Preferably, the mixed solution may be heated at a rate of 1 to 3° C./min.

The agitation may be performed at a speed of 150 rpm or less than 150 rpm for 5 to 10 minutes and then at a speed of 250 to 300 rpm for the remaining time.

Cooling Step (S3)

This step is a step of cooling and agitating the heated mixed solution. This is a step of cooling the mixed solution to precipitate the raw material synthesized in the heating step (S2) as solid particles.

The mixed solution is cooled to 30° C. or lower than 30° C. and then agitated for 30 minutes to 3 hours. Preferably, after the temperature is reduced at a rate of −1° C./min from the raised temperature to 15 to 30° C., the agitation is performed. Preferably, the mixed solution may be cooled at a rate of −1 to −3° C./min.

The agitation may be performed at a speed of 150 rpm or less than 150 rpm for 5 to 10 minutes and then at a speed of 250 to 300 rpm for the remaining time.

Re-Heating Step (S4)

This step is a step of heating and agitating the cooled mixed solution. This is a step of heating the cooled mixed solution to further dissolve the raw material that is not dissolved in the solvent, thus re-inducing the synthesis of the raw material.

The mixed solution is heated to 40° C. or higher than 40° C. and then agitated for 12 to 14 hours. Preferably, after the temperature is increased at a rate of 1° C./min from room temperature to 45 to 55° C., the agitation is performed. Preferably, the mixed solution may be heated at a rate of 1 to 3° C./min.

The agitation may be performed at a speed of 150 rpm or less than 150 rpm for 5 to 10 minutes and then at a speed of 250 to 300 rpm for the remaining time.

In the present disclosure, preferably, the heating step (S2), the cooling step (S3), and the re-heating step (S4) may be repeated two to three times.

In the present disclosure, the reaction is rapidly performed for a relatively short period of time before the re-heating step so that the intermediate product is rapidly manufactured and even the raw material present in the form of a complex compound dissolved in the solvent is finally reacted.

Drying Step

The method of manufacturing the sulfide-based solid electrolyte of the present disclosure may further include drying the mixed solution to remove the organic solvent.

The drying step may be performed after the heating step (S2), the cooling step (S3), and the re-heating step (S4), but may preferably be performed before the heat treatment step (S5).

Heat Treatment Step (S5)

This step is a step of performing the heat treatment. Preferably, the precipitated solid particles are heat-treated at high temperatures. The solid particles that are synthesized and precipitated through the heating step (S2), the cooling step (S3), and the re-heating step (S4) are heat-treated at high temperatures.

The heat treatment may be performed preferably at a temperature of 500° C. or higher for 4 to 10 hours and more preferably at a temperature of 550° C. or higher for 5 to 10 hours.

Sulfide-Based Solid Electrolyte

The present disclosure is configured for suppressing the impurities, which may be generated in a conventional manufacturing method, as much as possible using the above manufacturing method. Substantially, the solid particles that are finally heat-treated include only a compound including an argyrodite-type crystal structure represented by the following Chemical Formula 1.

$Li_{6-x}PS_{5-x}X_{1+x}(0 \leq x \leq 0.6)$ [Chemical Formula 1]

(in Chemical Formula 1, X is one or more selected from the group consisting of Cl, Br, I and combination thereof)

Preferably, the solid particles may include a compound represented by the following Chemical Formula 2.

$Li_6PS_5Cl$ [Chemical Formula 2]

The sulfide-based solid electrolyte of the present disclosure does not include impurities other than $Li_2S$.

The ionic conductivity of the sulfide-based solid electrolyte is preferably 2.8 mS/cm or more than 2.8 mS/cm.

Hereinafter, the present disclosure will be described in more detail through specific Examples. However, these Examples are for illustrative purposes only, and the scope of the present disclosure is not limited thereto.

Example 1

After $Li_2S$, $P_2S_5$, and LiCl were mixed with an acetonitrile solvent to manufacture a mixed solution, the mixed solution was heated at 1° C./min and agitated at 50° C. for 2 hours, and was cooled at 1° C./min and agitated at 20° C. for 2 hours, thus obtaining sulfide-based solid particles in a solution at 50° C. for 18 hours (the agitation was first performed at 150 rpm for 5 to 10 minutes and then at 280 rpm for the remaining time). After the reaction was completed, the organic solvent was volatilized using vacuum drying at room temperature for 24 hours, and heat treatment was performed at 550° C. for 5 hours, thus obtaining a sulfide-based solid electrolyte.

Example 2

A sulfide-based solid electrolyte was obtained in the same manner as in Example 1, except that the heating and cooling processes were repeated once more and synthesizing was performed for 14 hours.

Comparative Example 1

After $Li_2S$, $P_2S_5$, and LiCl were mixed with an acetonitrile solvent to manufacture a mixed solution as in Example 1, the agitation was performed at room temperature for 24 hours without separate heating and cooling processes to induce a reaction, the organic solvent was volatilized for 24 hours, and heat treatment was performed at 550° C. for 5 hours, thus obtaining a sulfide-based solid electrolyte.

Comparative Example 2

A sulfide-based solid electrolyte was obtained in the same manner as in Example 2, except that the temperature thereof was fixed only to 40° C. when the mixed solution was heated.

Comparative Example 3

A sulfide-based solid electrolyte was obtained in the same manner as in Example 1, except that the heating and cooling processes were repeated four times and a synthesizing time was set to 14 hours or less.

Test Example

Figure 2:
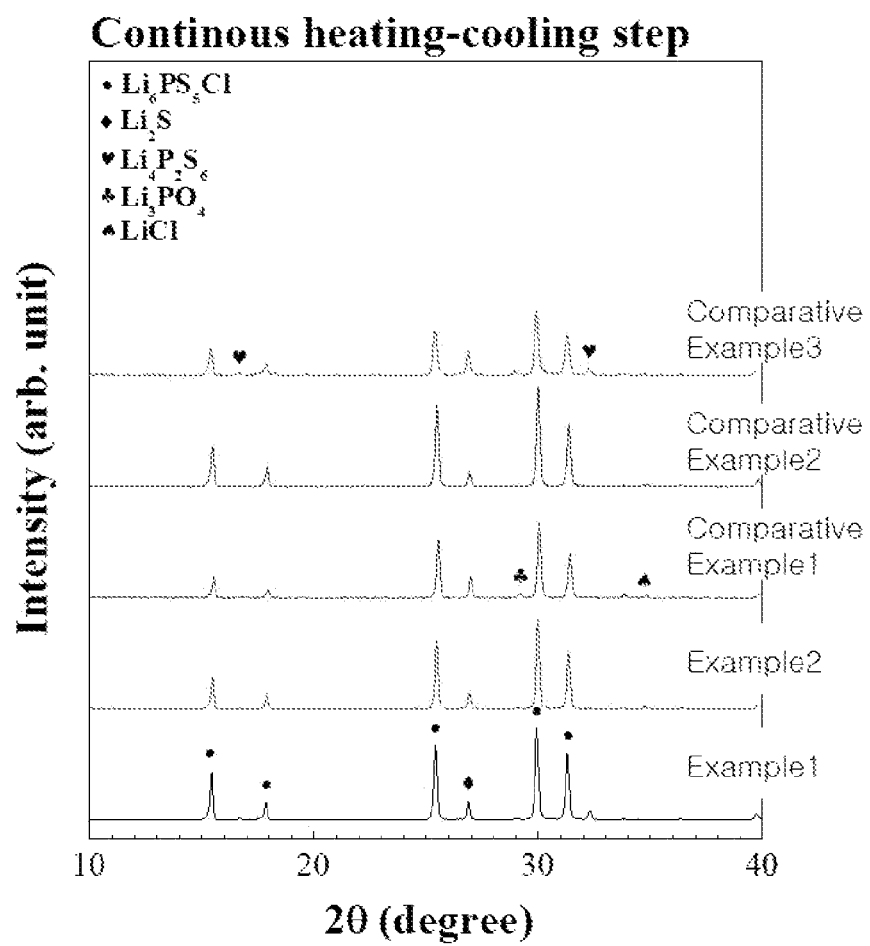
FIG. 2 shows the results of XRD analysis of the sulfide-based solid electrolytes manufactured in Examples and Comparative Examples.
Figure 3:
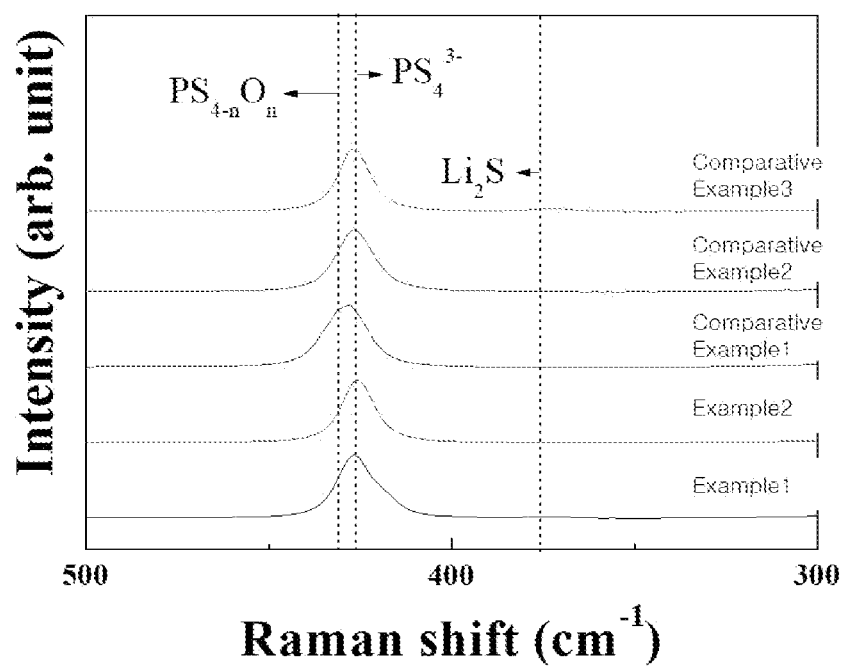
FIG. 3 shows the results of Raman analysis of the sulfide-based solid electrolytes manufactured in Examples and Comparative Examples.

The XRD analysis, Raman analysis, and ion conductivity measurement of the sulfide-based solid electrolytes manufactured in Examples 1 to 2 and Comparative Examples 1 to 3 were performed, and the results are shown in FIG. 2 and FIG. 3 and Table 1.

TABLE 1

| | XRD | Raman | Conductivity (mS/cm) |
|---|---|---|---|
| Example 1 | $Li_6PS_5Cl + Li_2S$ | $PS_4^{3-}$ | 3.2 |
| Example 2 | $Li_6PS_5Cl + Li_2S$ | $PS_4^{3-}$ | 3.5 |
| Comparative Example 1 | $Li_6PS_5Cl + Li_2S + Li_3PO_4$ | $PS_4^{3-} + Li_2S$ | 1.5 |
| Comparative Example 2 | $Li_6PS_5Cl + Li_2S$ | $PS_4^{3-}$ | 2.7 |
| Comparative Example 3 | $Li_6PS_5Cl + Li_2S + LiCl + Li_4P_2S_6$ | $P_2S_6^{4-} + PS_4^{3-}$ | 0.76 |

Referring to FIG. 2 and FIG. 3 and Table 1, from the result of XRD (X-ray diffraction) analysis, it may be seen that impurities other than $Li_6PS_5Cl$ and $Li_2S$ were detected in Comparative Examples 1 and 3. from the result of Raman analysis, it may be confirmed that in Comparative Examples 1 and 3, $Li_2S$ and $P_2S_6^{4-}$ in addition to $PS_4^{3-}$ were detected. Furthermore, referring to the ionic conductivity results, it may be confirmed that the ionic conductivity was 3.0 mS/cm in both Examples 1 and 2 but the ionic conductivity was low in the Comparative Examples.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of manufacturing a sulfide-based solid electrolyte, the method comprising:
   mixing a raw material with an organic solvent to manufacture a mixed solution;
   a heating step of heating and agitating the mixed solution;
   a cooling step of cooling and agitating the heated mixed solution;
   a re-heating step of heating and agitating the cooled mixed solution; and
   a heat treatment step of heat-treating the re-heated mixed solution,
   wherein the mixed solution is heated to 40° C. or higher than 40° C. and the mixed solution is cooled to 30° C. or lower than 30° C.,
   wherein the agitating in the heating step is performed for 30 minutes to 3 hours, the agitating in the cooling step is performed for 30 minutes to 3 hours, and the agitating in the re-heating step is performed for 12 to 14 hours.

2. The method of claim 1, wherein the raw material includes lithium sulfide, phosphorus sulfide, and a halogen compound, and the organic solvent includes any one selected from the group consisting of ethanol, propanol, butanol, dimethyl carbonate, ethyl acetate, tetrahydrofuran, 1,2-dimethoxyethane, propylene glycol dimethyl ether, acetonitrile, and a combination thereof.

3. A method of manufacturing a sulfide-based solid electrolyte, the method comprising:
mixing a raw material with an organic solvent to manufacture a mixed solution;
a heating step of heating and agitating the mixed solution;
a cooling step of cooling and agitating the heated mixed solution;
a re-heating step of heating and agitating the cooled mixed solution; and
a heat treatment step of heat-treating the re-heated mixed solution,
wherein the mixed solution is heated at 1 to 3° C./min in the heating step, the mixed solution is cooled at −1 to −3° C./min in the cooling step, and the mixed solution is heated at 1 to 3° C./min in the re-heating step.

4. The method of claim 1, wherein the mixed solution is heated to synthesize the raw material and the mixed solution is cooled to precipitate solid particles.

5. The method of claim 1, wherein the agitating in the heating step is performed at a speed of 150 revolutions per minute (rpm) or less for 5 to 10 minutes and then at 250 to 300 rpm for a remaining time, and the agitating in the cooling step is performed at a speed of 150 rpm or less than 150 rpm for 5 to 10 minutes and then at 250 to 300 rpm for a remaining time.

6. The method of claim 1, wherein after a temperature of the mixed solution is increased at a rate of 1° C./min from room temperature to 45 to 55° C., the agitating in the heating step is performed, after the temperature of the mixed solution is reduced at a rate of −1° C./min from the raised temperature to 15 to 30° C., the agitating in the cooling step is performed, and after the temperature of the mixed solution is increased at a rate of 1° C./min from the room temperature to 45 to 55° C., the agitating in re-heating step is performed.

7. The method of claim 1, wherein the heating step, the cooling step, and the re-heating step are repeated two to three times.

8. The method of claim 1, further including: a drying step of drying the mixed solution before the heat treatment step, thus removing the organic solvent.

9. The method of claim 1, wherein solid particles are heat-treated at a temperature of 500° C. or higher for 4 to 10 hours in the heat treatment step.

* * * * *